United States Patent Office 3,471,108
Patented Oct. 7, 1969

3,471,108
PERIODICALLY GROUNDED INERTIAL NAVIGATOR
Joseph J. Corso, East Haven, Conn., assignor to United Aircraft Corporation, East Hartford, Conn., a corporation of Delaware
Filed Dec. 14, 1966, Ser. No. 601,703
Int. Cl. B64c *13/50, 17/02*
U.S. Cl. 244—77                   24 Claims

ABSTRACT OF THE DISCLOSURE

In general my invention contemplates the provision of a three-axis stabilized platform mounted on an aircraft, such as a helicopter, which periodically alights on the earth's surface or which periodically makes contact with the earth, as by the lowering of a cable-suspended Sonar dome into the ocean. During the period of ground contact where the craft velocity is substantially zero, the platform is levelled and correction is made for drift in the gyroscopes and errors in the earth rate inputs. Navigation is performed from point to point only; and the platform is aligned with the desired ground track. The craft is forced to fly directly along the desired ground track; and the heading of the craft is implicitly controlled to maintain the relative wind substantially along the longitudinal axis of the craft.

BACKGROUND OF THE INVENTION

In the prior art, inertial navigators are required to determine craft position irrespective of the motion of the craft over the surface of the earth. That is, craft motion is assumed to be an independent variable. Thus it is required that inertial navigators be relatively complex in order to accommodate movement of the craft in any direction; and this necessitates the use of components of high quality and low drift in order to preserve accuracy of computation over extended time intervals.

In my invention craft motion is tightly restrained along a preselected path so that craft motion is no longer an independent variable. This considerably simplifies the navigational problem and the components required for its solution. Furthermore my inertial navigator is periodically grounded; which enables the periodic calibration of gyroscopes and earth rate inputs so that high accuracy may be achieved with components of reduced quality and expense.

SUMMARY OF THE INVENTION

One object of my invention is to provide an inertial navigator which is periodically grounded to permit of the calibration of the gyroscopes and the correction of the earth rate inputs and the levelling of the platform at frequent intervals.

Another object of my invention is to provide a periodically grounded inertial navigator in which the platform is aligned with the desired ground track and in which the craft is constrained to move along such predetermined ground track.

A further object of my invention is to provide a periodically grounded inertial navigator for an aircraft in which yaw is implicitly controlled to maintain the relative wind along the longitudinal axis.

Other and further objects of my invention will appear from the following description.

DESCRIPTION OF THE DRAWINGS

In the accompanying drawings which form part of the instant specification and which are to be read in conjunction therewith.

DESCRIPTION OF THE PREFERRED EMBODIMENT

Figure 1:
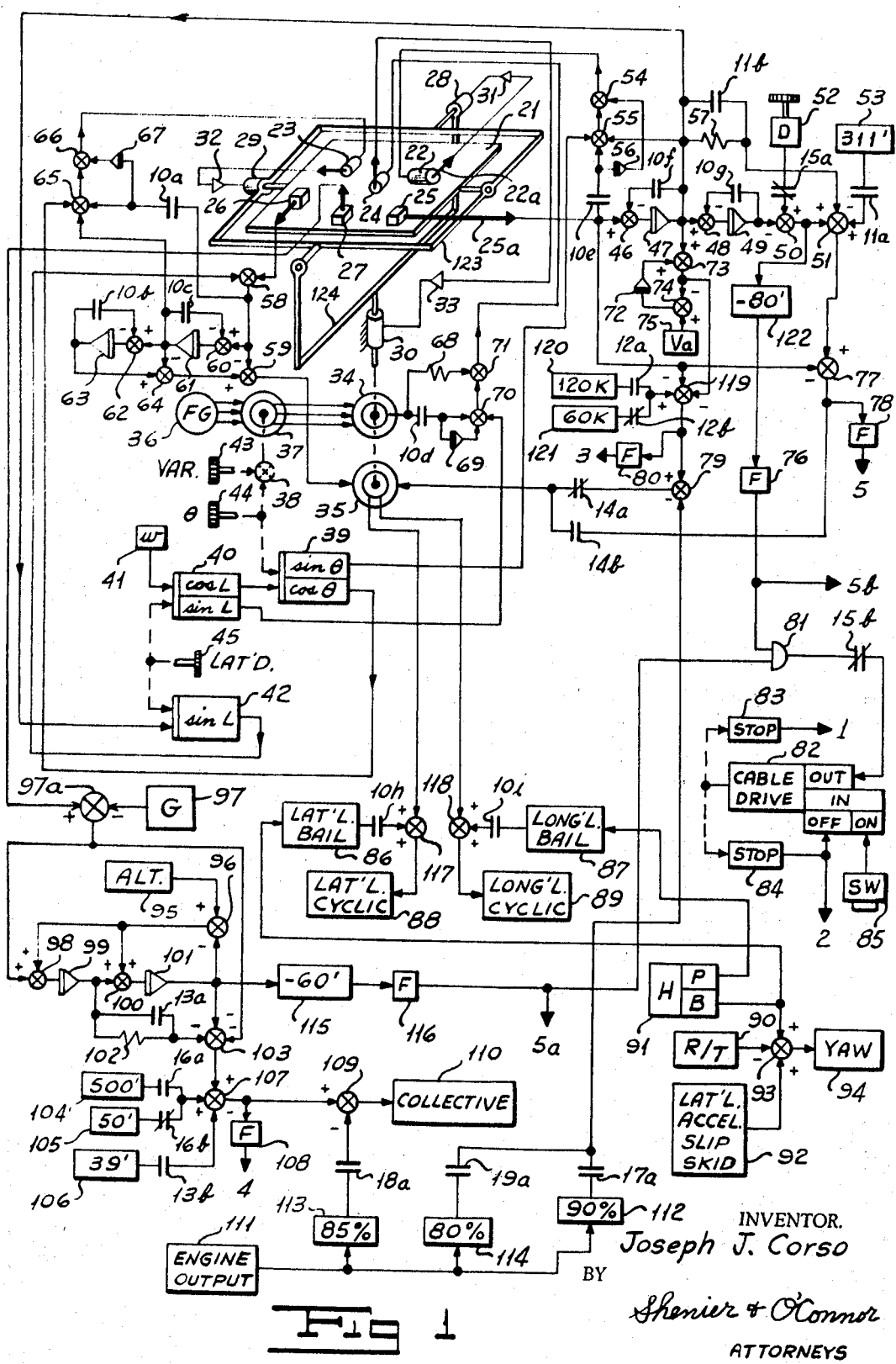
FIGURE 1 is a diagrammatic view showing a preferred embodiment of my invention.

More particularly, referring now to FIGURE 1 of the drawings, there is provided a platform 21 upon which are mounted gyroscopes 22, 23 and 24 and accelerometers 25, 26 and 27. The sensitive axis 25a of accelerometer 25 is aligned with the desired ground track; and hence accelerometer 25 is the "on-course" accelerometer. The input axis 22a of gyroscope 22 is horizontally disposed at right angles to the sensitive axis 25a of accelerometer 25; and gyroscope 22 is the "on-course" gyroscope.

The sensitive axis of accelerometer 26 is horizontally disposed at right angles to the desired flight path; and hence accelerometer 26 is the "cross-course" accelerometer. Gyroscope 23 is the cross-course gyroscope; and its pickoff output is applied through an amplifier 32 to a platform torque motor 29 which is mounted on an inner gimbal 123. The pickoff output of on-course gyroscope 22 is applied through an amplifier 31 to an inner gimbal torque motor 28 which is mounted on an outer gimbal 124. The pickoff output of the vertical or azimuth gyroscope 24 is applied through an amplifier 33 to an outer gimbal torque motor 30 which is mounted on the craft. Torque motor 30 also drives the rotors of a synchro 34 and a resolver 35 in synchronism with movements of the outer gimbal 124. Upon the craft is mounted a remote magnetic flux gate 36 providing outputs which are coupled to the stator of a control transformer 37. The rotor outputs of transformer 37 are applied to the stator of synchro 34. The rotor of control transformer 37 is mechanically positioned by the output shaft of a mechanical differential 38.

One input shaft of differential 38 is positioned by a manual control 43 in accordance with the magnetic variation at the assumed position of the craft. A manual control 44 is positioned in accordance with the desired true course θ from one point to the next. The manual control 44 drives a second input shaft of differential 38 and the rotor of a resolver 39. A manual control 45 is positioned in accordance with the latitude at the assumed position of the craft. The manual control 45 positions the rotors of resolvers 40 and 42. The rotor of resolver 40 is excited by a source of voltage 41 which is precisely scaled to represent the constant rate of rotation, *w,* of the earth about its polar axis. Accordingly the stator of resolver 40 provides outputs respectively representing (*w* cos *L*) and (*w* sin *L*). The (*w* cos *L*) output of resolver 40 is applied to the rotor of resolver 39 which accordingly provides respective stator outputs (*w* cos *L* sin θ) and (*w* cos *L* cos θ).

The output of on-course accelerometer 25 is coupled to a positive input of an adding circuit 46 the output of which drives an integrator 47. The output of integrator 47 is coupled through a normally open relay contact 10f to a negative input of adding circuit 46 and is also applied to a positive input of an adding circuit 48 the output of whch drives the integrators 49. The output of integrator 49 is coupled through a normally open relay contact 10g to a negative input of adding circuit 48 and is also applied to a negative input of an adding circuit 50 the output of which is coupled to a positive input of an adding circuit 51.

A potentiometer 52 is manually adjusted to provide a voltage in accordance with the distance D from one point to the next. The output of potentiometer 52 is applied through a normally closed relay contact 15a to a positive input of adding circuit 50. A voltage source 53 provides a signal which is precisely scaled to represent a horizontal distance of 311 feet and is coupled through a normally open relay contact 11a to a positive input of adding circuit 51. The output of accelerometer 25 is coupled through a normally open relay contact 10e to one input of adding circuit 55 and to the input of an integrator 56. The output of integrator 47 and the ($w \cos L \sin \theta$) output of resolver 39 are coupled to second and third inputs of adding circuit 55. The outputs of adding circuit 55 and of integrator 56 are coupled to first and second inputs of adding circuit 54 the output of which is applied to the torquing input of on-course gyroscope 22. The output of integrator 47 is coupled through a resistor 57 to a negative input of adding circuit 51. Resistor 57 is shunted by a normally open relay contact 11b.

The output of integrator 47 represents the on-course craft velocity, $v$, and is applied to the rotor winding of resolver 42 which accordingly provides a Coriolis acceleration stator output of ($v \sin L$). The outputs of cross-course accelerometer 26 and of resolver 42 are combined in an adding network 58, the output of which is applied to a positve input of adding circuit 60 and to a negative input of adding circuit 59. The output of adding circuit 60 is coupled to an integrator 61 the output of which is applied to a positive input of adding circuit 62 and to a negative input of adding circuit 64 and is also coupled through a normally open relay contact 10c to a negative input of adding circuit 60. The output of adding circuit 62 is applied to an integrator 63 the output of which is applied to a positive input of adding circuit 64 and is also coupled through a normally open relay contact 10b to a negative input of adding circuit 62. The output of adding circuit 64 is applied to a positive input of adding circuit 59 the output of which is coupled to one stator winding of resolver 35. The output of adding circuit 58 is coupled through a normally open contact 10a to one input of adding circuit 65 and to the input of an integrator 67. The output of integrator 61 and the ($w \cos L \cos \theta$) output of resolver 39 are applied to second and third inputs of adding circuit 65. The outputs of adding circuit 65 and of integrator 67 are coupled to first and second inputs of an adding circuit 66 the output of which is applied to the torquing input of cross-course gyroscope 23.

The rotor output winding of synchro 34 is coupled through a resistor 68 to one input of an adding circuit 71 and is also coupled through a normally open relay contact 10d to the input of an integrator 69 and to one input of an adding circuit 70. The ($w \sin L$) output of resolver 40 and the output of integrator 69 are applied to second and third inputs of adding circuit 70. The output of adding circuit 70 is coupled to a second input of adding circuit 71 the output of which is applied to the torquing input of the azimuth or vertical gyroscope 24.

The output of integrator 47 is coupled to a positive input of an adding circuit 73. A transducer 75 provides an output in accordance with either the true air speed or the indicated airspeed of the craft along its longitudinal axis. The output of airspeed transducer 75 is applied to a positive input of an adding circuit 74. The output of adding circuit 73 is coupled to a negative input of adding circuit 74, the output of which is applied to integrator 72. The output of integrator 72 is coupled to a positive input of adding circuit 73. Voltage sources 120 and 121 provide outputs scaled to represent respective air speeds of 120 knots and 60 knots. The outputs of sources 120 and 121 are coupled respectively through a normally open relay contact 12a a normally closed relay contact 12b to a positive input of adding circuit 119. The output of adding circuit 73 is coupled to a negative input of adding circuit 119. The output of on-course accelerometer 25 is coupled to a negative input of adding circuit 119 and to a negative input of adding circuit 77. The output of adding circuit 119 is applied to a positive input of adding circut 79 and to a flip-flop 80. The output of adding circuit 50 is applied to a circuit 122 which subtracts therefrom a constant voltage representing a horizontal distance of 80 feet. The output of subtraction circuit 122 drives a flip-flop 76. The output of adding circuit 51 is coupled to a positive input of adding circuit 77 the output of which drives a flip-flop 78. The outputs of adding circuits 77 and 79 are coupled respectively through a normally open relay contact 14b and a normally closed relay contact 14a to the other stator winding of resolver 35. The output of flip-flop 76 is coupled to one input of an AND circuit 81.

The output of AND circuit 81 is coupled through a normally closed relay contact 15b to actuate a cable drive motor 82 in such direction as to pay out cable and thus lower a Sonar dome. The cable drive 82 is provided with an "out" limit stop 83 which is actuated when the cable length reaches, for example 60 feet. A manually operable, spring-loaded switch 85 turns "on" a holding circuit which actuates the cable drive motor 82 in such direction as to pull in the cable and hence raise the Sonar dome. When the Sonar dome is fully raised the cable drive 82 actuates an "in" limit stop 84 which turns "off" the holding circuit for the "in" cable drive.

The cable supporting the Sonar dome extends through a lateral bail which is provided with a pickoff 86 and through a longitudinal bail which is provided with a pickoff 87. A gyro horizon 91 provides pitch P and bank B outputs which are respectively applied to bias the longitudinal bail pickoff 87 and the lateral bail pickoff 86. The biased outputs of pickoffs 86 and 87 will thus represent angular deviations of the cable from the true vertical, rather than angular deviations of the cable from the craft axes. The rotor outputs of resolver 35 are applied to respective positive inputs of adding circuits 117 and 118. The output of pickoff 86 is coupled through a normally open relay contact 10h to a positive input of adding circuit 117 the output of which actuates the lateral cyclic control 88 of the helicopter. The output of pickoff 87 is coupled through a normally open relay contact 10i to a positive input of adding circuit 118 the output of which actuates the longitudinal cyclic control 89 of the helicopter.

The craft is provided with a rate of turn gyroscope 90 generating an output which is applied to a negative input of adding circuit 93. The bank output of gyro horizon 91 is applied to a positive input of adding circuit 93. The craft is also provided with a lateral, slip-skid accelerometer 92. The output of lateral accelerometer 92 is coupled to a positive input of adding circuit 93 the output of which actuates the craft yaw control 94.

The craft is provided with either a radio or sonic absolute altimeter 95. Altimeter 95 is advantageously sonic and is preferably compensated for variations in the speed of sound due to changes in temperature. Absolute altimeter 95 may be either of the continuous wave type, or of the pulsed type, or of the modulated carrier type, wherein the carrier modulation is either in amplitude or in frequency. The output of vertical accelerometer 27 is applied to a positive input of adding circuit 97a which receives from voltage source 97 a negative input scaled to represent the mean gravitational acceleration of the earth. The output of circuit 97a is applied to a positive input of adding circuit 98. The output of adding circuit 98 is applied to an integrator 99 the output of which is coupled to a positive input of an adding circuit 100. The output of adding circuit 100 is applied to an integrator 101 the output of which is coupled to a negative input of an adding circuit 96 which receives a positive input from the sonic altimeter 95. The output of adding circuit 96 is applied to a positive input of each of adding circuits 98 and 100. The output of integrator 99 is coupled through a resistor 102 to a negative input of adding circuit 103 which receives further negative inputs from the outputs of integrator 101 and adding circuit 97a. Resistor 102 is shunted by normally open relay contact 13a.

Voltage sources 104, 105 and 106 are scaled to provide respective representations of 500 feet, 50 feet, and 39 feet of altitude. Sources 104 and 105 are coupled respectively through a normally open relay contacts 16a and a normally closed relay contact 16b to a positive input of an adding circuit 107. Source 106 is coupled through a normally open relay contact 13b to a negative input of adding circuit 107 which receives a positive input from the output of adding circuit 103. The output of adding circuit 107 drives a flip-flop 108 and is applied to a positive input of an adding circuit 109 the output of which actuates the collective control 110 of the helicopter. The craft is provided with a transducer 111 which measures the percentage power output of the engine. The engine output transducer 111 is coupled to the inputs of hysteresis circuits 112, 113 and 114. Hysteresis circuit 112 provides outputs only for engine power exceeding 90% with a scale factor of 11 knots of airspeed for each 1% in excess of 90% power. Hysteresis circuit 113 provides outputs only for engine power exceeding 85% with a scale factor of 80 feet of altitude for each 1% in excess of 85% power. Hysteresis circuit 114 provides outputs only for engine power exceeding 80% with a scale factor of 11 knots of airspeed for each 1% in excess of 80% power. The output of hysteresis circuit 113 is coupled through a normally open relay contact 18a to a negative input of adding circuit 109. The outputs of hysteresis circuits 112 and 114 are coupled respectively through normally open relay contacts 17a and 19a to a negative input of adding circuit 79. The output of integrator 101 is coupled to a circuit 115 which subtracts therefrom a constant voltage representing 60 feet of altitude. The output of subtraction circuit 115 is applied to a flip-flop 116 the output of which is coupled to a second input of AND circuit 81.

Figure 2:
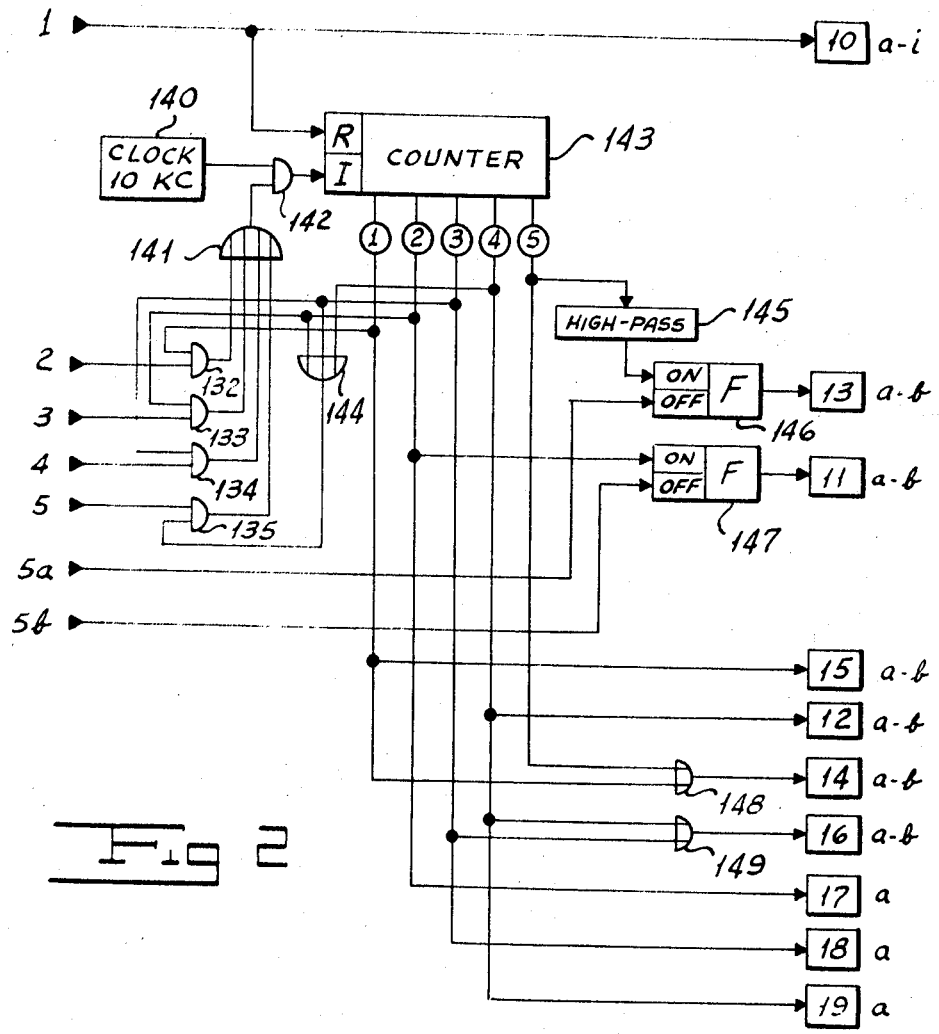
FIGURE 2 is a schematic view of a controller for achieving a preferred airspeed-altitude-distance profile along the flight path.

In FIGURE 1 there are provided sequential outputs which are utilized in FIGURE 2. The "out" limit stop 83 provides a 1 output. The "in" limit stop 84 provides a 2 output. Flip-flop 80 provides a 3 output. Flip-flop 108 rovies a 4 output. Flip-flop 78 provides a 5 output; and flip-flops 116 and 76 provides respective 5a and 5b outputs.

Referring now to FIGURE 2 of the drawings, the 1 output of limit stop 83 actuates a relay 10 which controls relay contacts 10a through 10i of FIGURE 1. The 1 output of limit stop 83 also resets a five position ring counter 143 to provide a 1 output therefrom. A 10 kilocycle clock source 140 is coupled to one input of AND circuit 142 the output of which is applied to the indexing input of counter 143. The 2 output of limit stop 84 is applied to one input of AND circuit 132 which receives another input from the 1 output of counter 143. The 3 output of flip-flop 80 is coupled to one input of AND circuit 133 which receives another input from the 2 output of counter 143. The 4 output of flip-flop 108 is coupled to one input of AND circuit 134 which receives a second input from the 3 output of counter 143. The 5 output of flip-flop 78 is coupled to one input of AND circuit 135. The 2, 3 and 4 outputs of counter 143 are coupled to OR circuit 144 the output of which is applied to a second input of AND circuit 135. The outputs of AND circuit 132 through 135 are applied to OR circuit 141 the output of which is coupled to a second input of AND circuit 142. The 5 output of counter 143 is coupled through a high-pass filter 145 to trigger "on" flip-flop 146. The 5a output of flip-flop 116 triggers flip-flop 146 "off". The 2 output of counter 143 triggers "on" flip-flop 147 which is triggered "off" by the 5b output of flip-flop 76.

The 1 and 5 outputs of counter 143 are applied to an OR circuit 148; and the 3 and 4 outputs of counter 143 are coupled to an OR circuit 149. Flip-flop 146 actuates a relay 13 which controls relay contacts 13a and 13b of FIGURE 1. Flip-flop 147 actuates a relay 11 which controls contacts 11a and 11b. The 1 output of counter 143 actuates a relay 15 which controls contacts 15a and 15b. The 4 output of counter 143 actuates a relay 12 which controls contacts 12a and 12b. The OR circuit 148 actuates a relay 14 which controls contacts 14a and 14b. The OR circuit 149 actuates a relay 16 which controls contacts 16a and 16b. The 2 output of counter 143 actuates a relay 17 which controls contact 17a. The 3 output of counter 143 actuates a relay 18 which controls contact 18a. The 4 output of counter 143 actuates a relay 19 which controls relay contact 19a of FIGURE 1.

Integrators 56, 67 and 69 preferably comprise motor driven potentiometers so that their output voltages will remain constant without any drift when respective relay contacts 10e, 10a and 10d are open. Integrator 72 may also comprise a motor driven potentiometer. The remaining integrators 47, 49, 61, 63, 99 and 101 preferably comprise chopper stabilized direct current operational amplifiers provided with feedback capacitors.

In operation of my invention, assume that the helicopter is at an altitude of 50 feet with 60 feet of cable extended so that the Sonar dome has a submergence of 10 feet; and "out" limit stop 83 provides a 1 output which actuates relay 10 and resets counter 143 to correspondingly provide a 1 output. The pilot adjusts the magnetic variation control 43 and the latitude control 45 in accordance with his assumed position. The pilot also adjusts control 44 and potentiometer 52 in accordance with the desired ground track $\theta$ and the distance D from the present dunk point to the next dunk point. The energization of relay 10 closes relay contacts 10a through 10i. Relay contacts 10c and 10b reset the cross-course velocity and distance integrators 61 and 63 to zero; and relay contacts 10f and 10g reset the on-course velocity and distance integrators 47 and 49 to zero.

The closing of contact 10a causes the output of cross-course accelerometer 26 to be applied to integrator 67 which builds up whatever output is required to compensate for drift in the cross-course gyroscope 23 and for errors in the ($w \cos L \cos \theta$) output of resolver 39. The cross-course system nulls only when the output of the cross-course accelerometer is zero; and hence the platform is levelled along this axis. The Coriolis acceleration correction resolver 42 cannot introduce any error since the output of the on-course velocity integrator 47 has been reset to zero.

With relay contact 10e closed, the output of on-course accelerometer 25 is applied to integrator 56 which builds up the required output to compensate for drift in on-course gyroscope 22 and for errors in the ($w \cos L \sin \theta$) output of resolver 39. The on-course system nulls only when the output of the on-course accelerometer 25 is zero; and hence the platform is levelled along this axis.

The rotor output of synchro 34 is always applied through a sensitivity reducing resistor 68 to azimuth gyro 24 in order to maintain the platform aligned with the preselected ground track $\theta$. The azimuth slaving rate provided through resistor 68 is relatively low, as for example 1° per minute. With relay contact 10d closed the rotor output of synchro 34 is directly applied with high gain through networks 70 and 71 to the torquing input of azimuth gyro 24. This high gain signal rapidly slews the platform in azimuth to the desired new ground track $\theta$ at a rate, for example of 3° per second. The rotor output of synchro 34 is further applied to integrator 69 which builds up the required output to compensate for drift in azimuth gyro 24 and for errors in the ($w \sin L$) output of resolver 40. It will be appreciated that where it is desired to fly magnetic courses, rather than true courses, then variation control 43 and mechanical differential 38 may be omitted; and the ground track $\theta$ control 44 would directly position the rotor of control transformer 37.

The output of cross-course accelerometer 26 is coupled through networks 58 and 59 into resolver 35. The 1 output from counter 143 is coupled through OR circuit 148 to actuate relay 14 which opens contact 14a and closes contact 14b. The output of on-course accelerometer 25 is coupled through network 77 and contact 14b to resolver 35. Resolver 35 transforms the outputs of the horizontal platform accelerometers 25 and 26 into components along the lateral and longitudinal axes of the craft where they are respectively introduced into networks 117 and 118 which in turn actuate the lateral and longitudinal cyclic controls 88 and 89 to maintain the cable in a vertical position as measured by the horizontal gyro 91. This maintains the helicopter at a cable angle hover with zero velocity wherein damping is obtained from the horizontal platform accelerometers 25 and 26 through resolver 35. The 1 output from counter 143 actuates relay 15 which opens contact 15a so that no extraneous distance signal from potentiometer 52 can be coupled through networks 50 and 51 into network 77.

The output from vertical accelerometer 27 is corrected for the acceleration of gravity by source 97 so that the output from network 97a is substantially zero in the absence of a vertical acceleration of the craft. The outputs of the vertical velocity integrator 99 and of the altitude integrator 101 are coupled through network 103 to network 107 for comparison with the commanded 50 feet of altitude from source 105 which is coupled through contact 16b. The altitude error signal is then applied through network 109 to actuate the collective control 110 in order to maintain the commanded altitude. The inertially computed altitude from integrator 101 is continually compared with the altitude indications provided by sonic altimeter 95. Sonic altimeter 95 provides only the correct average altitude since its indications will fluctuate due to the presence of wave crests and troughs. The output from comparison network 96 is applied with low gain to networks 98 and 100 in order gradually to bring the output of integrator 101 into equality with the average output of sonic altimeter 95.

If the cable angle hover occurs with the craft not headed into the wind, then the lateral cyclic control 88 will be displaced from its neutral position; and the craft will be tilted laterally. This will occasion outputs both from the bank pickoff of horizon 91 and from the lateral slip-skid accelerometer 92 which will actuate the yaw control 94 and produce a corresponding craft rate of turn as measured by transducer 90 until the craft is headed into the wind, whereupon the bank output of horizon 91 and the output of lateral accelerometer 92 will be zero.

In order to fly to the next dunk point the pilot need only momentarily depress spring-loaded switch 85, since the entire subsequent sequence of events is performed automatically. When switch 85 is momentarily depressed, the holding circuit for the "in" cable drive is turned "on," which actuates the cable drive motor 82. As soon as upward movement of the cable begins, "out" limit stop 83 no longer provides a 1 output. Relay 10 is deenergized; and contacts 10a through 10i return to their normally open positions. On-course velocity and distance integrators 47 and 49 are now enabled to apply signals through resistor 57 and networks 50 and 51 to network 77 and thence through contact 14b to resolver 35. Similarly cross-course velocity and distance integrators 61 and 63 are now enabled to apply signals through networks 64 and 59 to resolver 35. Resolver 35 transforms these velocity and distance and acceleration indications in platform coordinates into corresponding components along the lateral and longitudinal axes of the craft where they are respectively coupled through networks 117 and 118 to actuate the lateral and longitudinal cyclic controls 88 and 89. The craft is thus maintained at an inertial hover and will not drift while the cable is being pulled in. The opening of relay contacts 10h and 10i prevents the application of any biased cable angle signals from bails 86 and 87 to the cyclic controls. The azimuth system is restored to the low slaving rate through only resistor 68 so that momentary magnetic anomalies during the flight from one dunk point to the next do not disturb the azimuthal orientation of the platform. The opening of contacts 10a, 10d, and 10e removes all input signals to integrators 67, 69, and 56 so that the outputs of these integrators maintain the signals which compensate for drift in the gyroscopes and errors in the earth rate inputs from resolvers 39 and 40.

It will be appreciated that components 39, 40, and 41 may be omitted. Then integrators 56, 67, and 69 will provide the entire earth rate inputs rather than merely corrections for errors in the outputs of resolvers 39 and 40. In my inertial navigator, components 39, 40, and 41 can be omitted because little change in latitude or longitude occurs if the distance between dunk points is less than, for example 10 miles.

When the cable is fully raised, the "in" limit stop 84 triggers "off" the "in" cable drive flip-flop which in turn stops the cable drive motor 82. The 1 output of counter 143 enables AND circuit 132. The "in" limit stop 84 also provides a 2 output which is coupled through enabled AND circuit 132 and OR circuit 141 to enable AND circuit 142 to pass the next pulse from clock source 140 and thus index counter 143 from a 1 output to a 2 output. The 2 output of counter 143 actuates relay 17 which closes contact 17a and also turns "on" flip-flop 147 which actuates relay 11, closing contacts 11a and 11b. The absence of a 1 output from counter 143 deenergizes relays 14 and 15 thus permitting contacts 14a, 14b, 15a, and 15b to return to the positions shown.

When contact 14a closes, the 60 knot air speed command signal from source 121 is coupled through networks 119 and 79 to resolver 35 which actuates the cyclic controls in a direction to produce movement along the desired ground track. The ground speed along this track is provided by on-course velocity integrator 47. Meter 75 measures the longitudinal component of air speed but is subject to noise due to wind gusts and other transients. The airspeed signal and the output of network 73 are continually compared in network 74; and any difference therebetween causes integrator 72 to build up an output which is coupled to network 73. Accordingly the output of network 73 has a steady state or average value in accordance with the average air speed as measured by transducer 75 and has inertially determined transient values as provided by the output of ground speed integrator 47. Thus the output of network 73 is a relatively noise-free airspeed signal. The craft accelerates toward 60 knots airspeed at an altitude of 50 feet. Rates of turn are produced by yaw control 94 to maintain the relative wind along the longitudinal axis so that the output of the lateral accelerometer 92 is nulled. As the cyclic controls move from a neutral position, the rotor tilts more and more from a horizontal plane. This causes an increase in the collective pitch 110 in order to maintain the altitude at 50 feet. The increase in collective pitch requires increased engine power in order to maintain the rotor speed constant. The amount of horizontal acceleration which can be obtained is limited by the available power of the engine. When the engine power increases to above 90%, outputs are produced from hysteresis circuit 112 which are now coupled through closed contact 17a into network 79 to oppose the commanded air speed of 60 knots. Upon initial acceleration, when the airspeed is close to zero, the engine output increases to approximately 95%; and hysteresis circuit 112 provides an opposing signal corresponding to $5\% \times 11$ knots/$1\% = 55$ knots. With an engine output of 95% the net airspeed error signal is 60−55=5 knots. This net error signal is opposed by the output from on-course accelerometer 25 so that the output from network 79 operates at a null. As the airspeed builds up to 55 knots as represented by the output of network 73, the engine output as measured by transducer 111 gradually decreases to 90%, where no output is produced from hysteresis circuit 112. The output of network 119 now operates at a null; and flip-flop 80 is triggered to provide a 3 output. The 2 output of counter 143 enables AND circuit 133. The 3 output from flip-flop 80 is coupled through enabled AND circuit 133 and OR circuit 141 to enable AND circuit 142 to pass the next pulse from clock source 140 and thus index counter 143 from a 2 output to a 3 output. The 3 output of counter 143 actuates relay 18 and is coupled through OR circuit 149 to actuate relay 16. The absence of a 2 output from counter 143 deenergizes relay 17 permitting contact 17a to open.

The energization of relay 16 closes contact 16a and opens contact 16b thus changing the commanded altitude from 50 feet to 500 feet. This produces an increase in collective pitch 110 which causes the craft to climb. During the initial portion of the climb the air speed increases from 55 knots to the commanded airspeed of 60 knots where it remains constant. The maximum rate of climb is limited by the available engine power. Hysteresis circuit 113 produces outputs for engine powers exceeding 85% which are now coupled through the closed relay contact 18a into network 109 to subtract from the commanded altitude. During the initial portion of the climb the engine output remains 90%; and the output from hysteresis circuit 113 is 5%×80 feet/1%=400 feet. Since the craft is already at an altitude of 50 feet the net altitude error is 500−50−400=50 feet. This error signal is opposed by the output of vertical velocity integrator 99 coupled through resistor 102 so that the output of network 109 operates at a null. As the craft climbs to 450 feet, the engine output gradually decreases to 85% where no output is produced from hysteresis circuit 113. The output from network 107 now operates at a null; and flip-flop 108 is triggered to provide a 4 output.

The 3 output from counter 143 enables AND circuit 134. The 4 output from flip-flop 108 is coupled through enabled AND circuit 134 and OR circuit 141 to enable AND circuit 142 to pass the next pulse from clock source 140 and thus index counter 143 from a 3 output to a 4 output. The 4 output of counter 143 actuates relays 12 and 19 and is coupled through OR circuit 149 to maintain relay 16 actuated. The absence of a 3 output from counter 143 deenergizes relay 18.

The actuation of relay 12 closes contact 12a and opens contact 12b thus changing the commanded airspeed from 60 knots to 120 knots. This actuates the cyclic controls to accelerate the craft from climbing speed to cruising speed. During the initial portion of the acceleratiton to cruising speed the craft climbs from 450 feet to the commanded altitude of 500 feet. The maximum acceleration is limited by the available engine power. Hysteresis circuit 114 produces outputs for engine powers exceeding 80% which are now coupled through closed relay contact 19a into network 79 to subtract from the commanded airspeed of 120 knots. The engine output remains at 85% where hysteresis circuit 114 produces an output of 5%×11 knots/1%=55 knots. Since the craft is already at an air speed of 60 knots, the net airspeed error signal is 120−60−55=5 knots. This error signal is opposed by the output from on-course accelerometer 25 so that the output of network 79 operates at a null. As the airspeed builds up to 115 knots, the engine output decreases to 80%, where no output is produced from hysteresis circuit 114. The craft now accelerates from 115 knots to the commanded airspeed of 120 knots; and the engine output decreases from 80% to an economy cruising power of approximately 60%.

The craft will not deviate from a straight line flight path between dunk points, since cross-course velocity and distance integrators 61 and 63 would then generate signals which are coupled through resolver 35 into the cyclic controls to return the craft to the desired ground track. The ground track is a substantially straight line with negligible curvature, since resolver 42 couples into network 58 substantially the proper Coriolis acceleration correction for cross-course accelerometer 26.

It will be recalled that the 2 output from counter 143 turned "on" flip-flop 147 to actuate relay 11 thus closing contacts 11a and 11b. The closing of contact 11a introduces an offset into the distance command from potentiometer 52. This creates a phantom dunk point which lies 311 feet beyond the true dunk point. The closing of contact 11b short circuits resistor 57 thus augmenting the on-course velocity signal from integrator 47 which is coupled into network 51 to increase the damping. In the absence of any wind so that the cruising ground speed is also 120 knots, the output of network 77 will be nulled when the craft is 3600 feet from the true dunk point and hence 3600+311=3911 feet from the phantom dunk point. When the output of network 77 is nulled, flip-flop 78 is triggered to provide a 5 output.

The 4 output from counter 143 is coupled through OR circuit 144 to enable AND circuit 135. The 5 output from flip-flop 78 is coupled through enabled AND circuit 135 and OR circuit 141 to enable AND circuit 142 to pass the next pulse from clock source 140 and thus index counter 143 from a 4 output to a 5 output. The 5 output from counter 143 is coupled through the high-pass or differentiating circuit 145 to trigger "on" flip-flop 146 which actuates relay 13. The 5 output from counter 143 is also coupled through OR circuit 148 to actuate relay 14. The absence of a 4 output from counter 143 deenergizes relay 16 thus permitting contacts 16a and 16b to return to the positions shown where the commanded altitude is 50 feet. The actuation of relay 14 opens contact 14a and closes contact 14b so that the output of network 77 is now coupled to resolver 35. The actuation of relay 13 closes contacts 13a and 13b. The closing of contact 13a short circuits resistor 102 thus augmenting the vertical velocity signal from integrator 99 which is coupled into network 103 to increase the damping. The closing of contact 13b introduces an offset into the true hovering altitude command from source 105. This creates a phantom hovering altitude which lies 39 feet below the true hovering altitude. The phantom hovering altitude is thus 50−39=11 feet. The craft now enters a glide with an initial rate of descent of 1500 feet per minute or 25 feet per second. The initial horizontal velocity as the craft enters the glide is 120 knots or approximately 200 feet per second. The glide ratio is 8:1 which is 7.14°. The increased damping provided with contacts 11b and 13a closed produces a time constant of 19.6 seconds in both the altitude and on-course distance channels. Accordingly the craft descends in a straight line glide path toward a phantom hovering point which is at an altitude of 11 feet and a distance 311 feet beyond the true dunk point. During this glide, both the horizontal and vertical velocities exponentially approach zero. After a lapse of time corresponding to 2.3 time-constants or 2.3×19.6=45 seconds, the vertical and horizontal velocities are one-tenth of their initial values; and the horizontal and vertical distances from the phantom hovering point are also one-tenth of their initial values. Thus 45 seconds after the triggering of flip-flop 78, the horizontal velocity is 20 feet per second, the vertical velocity is 2.5 feet per second, and the horizontal distance of the craft from the phantom dunk point is 391 feet. The phantom hovering altitude is 11 feet; and the total change from cruising altitude is 500−11=489 feet. Hence after the lapse of 45 seconds from the triggering of relay 78, the craft is at an altitude which is 49 feet above the phantom hovering altitude or at an altitude of 49+11=60 feet. Thus the craft is at a position which is 391−311=80 feet short of the true dunk point and at an altitude which is 60−50=10 feet above the true hovering altitude. As the craft passes through this position the output of horizontal distance subtraction circuit 122 passes through zero, triggering flip-flop 76 to provide a 5b output; and the output of altitude subtraction circuit 115 also passes through zero, triggering flip-flop 116 to provide a 5a output. The 5a output from flip-flop 116 triggers "off" flip-flop 146, deenergizing relay 13 and permitting contacts 13a and 13b to return to the position shown. The 5b output of flip-flop 76 triggers "off" flip-flop 147, deenergizing relay 11 and permitting contacts 11a and 11b to return to the position shown. The opening of contact 11a eliminates the offset distance of the phantom dunk point; and the opening of contact 13b eliminates the offset of the phantom hovering altitude. Thus there are introduced only the distance and altitude corresponding to the true hovering point. The craft exponentially approaches the true hovering point. The opening of contacts 11b and 13a reduces the damping and thus reduces the time-constant in both the altitude and on-course distance channels to 4 seconds. The presence of both 5a and 5b outputs from flip-flops 116 and 76 produces an output signal from AND circuit 81. This signal is coupled through relay contact 15b and excites the cable drive motor 82 to pay out cable and lower the Sonar dome. During the initial portion of cable pay out the craft covers the ramining 80 feet of horizontal distance to the true dunk point and descends through the remaining 10 feet of altitude to the true hovering altitude. By the time 50 feet of cable have been paid out the craft is substantially motionless at the true hovering point so that no damage to the Sonar dome will occur as is makes contact with the water. When 60 feet of cable have been paid out and the Sonar dome has a submergence of 10 feet, "out" limit stop 83 provides a 1 output which resets counter 143 to provide a 1 output. The 1 output from counter 143 energizes relay 15 which opens contact 15b and prevents the application of further signals from AND circuit 81 to the "out" cable drive. This completes one cycle of operation. The system maintains a cable angle hover until the pilot again momentarily depresses spring loaded switch 85, once he has set in the bearing and distance of a subsequent dunk point.

The distance between dunk points may be made arbitrarily small. My system is normally programmed to accelerate toward 60 knots at 50 feet of altitude, to climb toward 500 feet of altitude at 60 knots, and then accelerate to 120 knots at 500 feet of altitude. The horizontal accelerations and vertical climb rates will depend upon the gross weight of the aircraft and will of course increase as fuel is consumed. During these three steps of the normal flight profile in accelerating, climbing and accelerating from a hover at 50 feet of altitude to a cruising speed of 120 knots at 500 feet of altitude, counter 143 will successively provide 2, 3, and 4 outputs. If the distance between dunk points is less than 500 to 1000 feet, for example, then flip-flop 78 may be triggered to provide a 5 output before flip-flop 80 is triggered to provide a 3 output. The 2, 3, and 4 outputs of counter 143 are coupled through OR circuit 144 to enable AND circuit 135. The 5 output from flip-flop 78 is then coupled through enabled AND circuit 135 and OR circuit 141 to enable AND circuit 142 to pass the next three pulses from clock source 140 and thus rapidly index counter 143 from a 2 output to a 5 output. This bypasses the second and third steps of the normal flight profile. With the craft still at an altitude of 50 feet, flip-flop 116 will provide a 5a output so that flip-flop 146 is not triggered "on" by the 5 output of counter 143 through high-pass filter 145; and the craft remains at an altitude of 50 feet in approaching the dunk point. If the distance between dunk points appreciably exceeds 80 feet, then there will be a two-stage approach to hover in the on-course distance channel with a variable offset distance and a variable damping. If the distance between dunk points does not appreciably exceed 80 feet, then flip-flop 76 will be triggered to provide a 5b output before flip-flop 78 is triggered to provide a 5 output. In such event the approach to hover will take place in a single stage with no offset distance and with only low damping.

It will be seen that I have accomplished the objects of my invention. During cable angle hover the platform is levelled, the gyroscopes are calibrated for both drift and earth rates, and the platform accelerometers are utilized for damping the cable angle signals. The platform is oriented in azimuth to the desired ground track by a dual sensitivity magnetic slaving system. The interial altitude channel is continuously calibrated by an absolute altimeter. The inertially computed ground speed is continuously calibrated by measured airspeed to provide a low noise airspeed signal for establishing climb and cruise airspeeds without the necessity for performing wind resolution computations. The approach to hover at a dunk point is made in two stages with variable offset altitudes and horizontal distances and with variable dampings to reduce the elapsed time between dunk points. In my navigator the craft is constrained to move in a straight line between dunk points; and the yaw channel is implicitly controlled to maintain the relative wind along the craft's longitudinal axis. The horizontal acceleration and vertical climb rates are continuously regulated by engine power output to reduce to a minimum the required time for acceleration and climb consonant with conservative operation of the craft's power plant.

It will be understood that certain features and subcombinations are of utility and may be employed without reference to other features and subcombinations. It is therefore to be understood that my invention is not to be limited to the specific details shown and described.

Having thus described my invention, what I claim is:

1. An inertial navigator for a craft including in combination a stable platform provided with a pair of accelerometers having orthogonally disposed horizontal sensitive axes and provided with an azimuth gyroscope, means providing a command signal in accordance with the bearing of a desired ground track of the craft, means responsive to the command signal for torquing the azimuth gyroscope until the sensitive axis of a first accelerometer is aligned with said ground track, and means responsive to the second accelerometer for preventing deviations of the craft from said ground track.

2. An inertial navigator as in claim 1 in which the torquing means is selectively provided with high and low sensitivities.

3. An inertial navigator as in claim 1 in which the torquing means comprises an integrator having an input and providing an output and means for selectively disabling the integrator input to maintain the integrator output constant.

4. An inertial navigator as in claim 3 in which the integrator comprises a motor.

5. An inertial navigator as in claim 1 for an aircraft which further includes a gyroscopic horizon providing a bank output and means responsive to the bank output for controlling the aircraft in yaw.

6. An inertial navigator as in claim 1 for an aircraft having a lateral axis which further includes a lateral slip-skid accelerometer and means responsive to said lateral accelerometer for controlling the aircraft in yaw.

7. An inertial navigator as in claim 1 which further includes an integrator responsive to the first accelerometer, means responsive to the integrator for providing a Coriolis acceleration signal, and means coupling said signal to the deviation preventing means.

8. An inertial navigator as in claim 1 in which the means preventing deviations comprises a resolver responsive to relative azimuthal rotation between the platform and the craft.

9. An inertial navigator including in combination a stable platform provided with a pair of accelerometers having orthogonally disposed horizontal sensitive axes, an integrator providing an output in response to one accelerometer, means responsive to the integrator for controlling rotation of the platform about the sensitive axis of the other accelerometer, and means for selectively resetting the integrator output to zero.

10. An inertial navigator as in claim 9 which further includes means selectively responsive to one accelerometer for levelling the platform about the sensitive axis of the other accelerometer.

11. An inertial navigator as in claim 9 which further includes a second integrator having an input, means selectively coupling one accelerometer to the input of the second integrator, and means responsive to the second integrator for levelling the platform about the sensitive axis of the other accelerometer.

12. An inertial navigator as in claim 11 in which the second integrator comprises a motor.

13. An inertial navigator for an aircraft including in combination a stable platform provided with an accelerometer having a horizontally disposed sensitive axis, an airspeed meter providing an output, a first integrator providing an output in response to the accelerometer, a second integrator providing an output, means algebraically combining the integrator outputs, means for comparing the combined outputs with the output of the airspeed meter, means responsive to the comparing means for driving the second integrator, and means responsive to the combining means for controlling the airspeed of the craft.

14. An inertial navigator for an aircraft including in combination a stable platform provided with a vertical accelerometer generating an output, an absolute altimeter, means compensating the output of the vertical accelerometer for gravity, means for doubly integrating the compensated output, comparing means responsive to the altimeter and the double integrating means, means responsive to the comparing means for introducing correction signals into the integrating means, and means responsive to the integrating means for controlling the altitude of the craft.

15. A control system for an aircraft hovering over a fixed point on the earth at a predetermined and relatively low altitude including in combination first means for causing the aircraft to maintain said predetermined low altitude and to accelerate to a predetermined airspeed, second means for causing the aircraft to maintain said predetermined airspeed and to climb to a certain higher altitude, third means for causing the aircraft to maintain said certain higher altitude and to accelerate to a greater airspeed, and means for sequentially enabling the first and the second and the third means.

16. A control system as in claim 15 which further includes means for selectively disabling the third means.

17. A control system as in claim 15 which further includes means for selectively disabling the second and third means.

18. A control system as in claim 15 for an aircraft having an engine which further includes means responsive to the output of the engine for restricting the horizontal accelerations provided by the first and third means and for restricting the rate of climb provided by the second means.

19. A control system for a hoverable aircraft including in combination means providing a signal in accordance with the difference in altitude of the aircraft from a predetermined hovering altitude, means providing a signal in accordance with the horizontal distance of the aircraft from a predetermined hovering position, and means responsive to both signals for causing the aircraft to descend along a straight line glide path to a hover at said predetermined altitude and position.

20. A control system as in claim 19 in which the glide path means includes means for initially causing the aircraft to descend toward a phantom point below said predetermined altitude and beyond said position which lies on an extension of said straight line.

21. A control system as in claim 20 in which the initial descent means comprises means providing a relatively long time-constant.

22. A control system as in claim 19 in which the glide path means comprises means initially providing high damping and subsequently providing low damping as the aircraft approaches said predetermined altitude and position.

23. A control system for a craft including in combination means for sensing the horizontal velocity of the craft, means for providing a command signal in accordance with the horizontal distance of the craft from a certain point, means for providing an offset horizontal distance signal, means responsive to the velocity sensing means for providing a high-damping signal and a low-damping signal, means responsive to said signals for selectively providing a first output in accordance with an algebraic combination of the command and offset and high-damping signals and for selectively providing a second output in accordance with an algebraic combination of the command and low damping signals, and means responsive to said outputs for governing horizontal motion of the craft.

24. A control system for a craft including in combination means for sensing the vertical velocity of the craft, means for providing a command signal in accordance with the difference between the actual vertical distance and a desired vertical distance from sea level, means for providing an offset vertical distance signal, means responsive to the velocity sensing means for providing a high-damping signal and a low-damping signal, means responsive to said signals for selectively providing a first output in accordance with an algebraic combination of the command and offset and high-damping signals and for selectively providing a second output in accordance with an algebraic combination of the command and low-damping signals, and means responsive to said outputs for governing vertical motion of the craft.

References Cited

UNITED STATES PATENTS

| | | | |
|---|---|---|---|
| 2,756,007 | 7/1956 | Laskowitz | 244—17.19 X |
| 2,914,763 | 11/1959 | Greenwood et al. | |
| 2,944,426 | 7/1960 | Amara. | |
| 3,284,617 | 11/1966 | Lerman | 235—150.25 |
| 3,302,908 | 2/1967 | Lazareff. | |

FERGUS S. MIDDLETON, Primary Examiner

U.S. Cl. X.R.

244—17.13; 318—489